(12) United States Patent
Tillman et al.

(10) Patent No.: US 7,665,072 B2
(45) Date of Patent: Feb. 16, 2010

(54) GENERATING TEST CASES FOR SOFTWARE WITH COMPLEX PRECONDITIONS

(75) Inventors: Nikolai Tillman, Redmond, WA (US); Colin L. Campbell, Seattle, WA (US); Wolfgang Grieskamp, Redmond, WA (US); Lev Borisovich Nachmanson, Redmond, WA (US); Wolfram Schulte, Bellevue, WA (US); Margus Veanes, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 1203 days.

(21) Appl. No.: 11/112,282

(22) Filed: Apr. 21, 2005

(65) Prior Publication Data

US 2006/0242466 A1    Oct. 26, 2006

(51) Int. Cl.
  *G06F 9/44*    (2006.01)
(52) U.S. Cl. .................. 717/132; 717/126; 717/133
(58) Field of Classification Search .................. None
  See application file for complete search history.

(56) References Cited

U.S. PATENT DOCUMENTS

| | | | |
|---|---|---|---|
| 5,389,838 A | 2/1995 | Orengo |
| 5,913,061 A | 6/1999 | Gupta et al. |
| 6,038,378 A | 3/2000 | Kita et al. |
| 6,973,638 B1 | 12/2005 | Gangopadhyay et al. |
| 6,993,706 B2 | 1/2006 | Cook |
| 7,076,417 B2 | 7/2006 | Jain et al. |
| 7,088,864 B2 | 8/2006 | Grieskamp et al. |
| 2003/0121027 A1 | 6/2003 | Hines |
| 2005/0160404 A1 | 7/2005 | Nachmanson et al. |
| 2006/0214948 A1* | 9/2006 | Murthy ........................ 345/622 |

OTHER PUBLICATIONS

King, "Symbolic Execution and Program Testing," Communications of the ACM, vol. 19, No. 7, 1976, pp. 385-394.
Hoare, "An Axiomatic Basis for Computer Programming," Communications of the ACM, vol. 12, No. 10, 1969, pp. 576-583.
Visser et al. "Test Input Generation with Java PathFinder," ISSTA '04, Jul. 11-14, 2004, Boston, Massachusetts, pp. 97-107.
Barnett et al., "The Spec# Programming System: An Overview," CASSIS 2004, LNCD 3362, pp. 49-69, 2005.
Barnett et al., Towards a Tool Environment for Model-Based Testing with AsmL, In 3rd International Workshop on Formal Approaches to Testing of Software (FATES 2003), Oct. 2003, 9 pages.

(Continued)

*Primary Examiner*—Jason Mitchell
(74) *Attorney, Agent, or Firm*—Klarquist Sparkman, LLP

(57) ABSTRACT

Techniques and tools for generating test cases for methods or programs with input preconditions are described. For example, after finding feasible control flow paths for a tested method along with each path's associated input conditions, a new program is created which tests these conditions along with the precondition. By analyzing this new program's control flow graph, a class of test cases is found while avoiding inefficiencies created by doing complete searches of paths through the combined control flow graph of the precondition and the method. Additional efficiencies are introduced by partitioning a control flow graph for the precondition into branched and straight sections.

14 Claims, 10 Drawing Sheets

OTHER PUBLICATIONS

Blass et al., "Play to test," Technical Report MSR-TR-2005-04, Microsoft Research, 15 pages, Jan. 2005.

Cacciari et al., "Controllability and observability in distributed testing," *Information and Software Technology*, 41, pp. 767-780, 1999.

Campbell, et al., "Multiplexing of Partially Ordered Events," TestCom 2005, LNCS 3502, pp. 97-110, 2005.

De Alfaro, "Game Models for Open Systems," *Verification: Theory and Practice: Essays Dedicated to Zohar Manna on the Occasion of His 64$^{th}$ Birthday*, vol. 2772 of LNCS, pp. 269-289, 2004.

De Alfaro et al, "Interface Automata," *Proceedings of the 8$^{th}$ European Software Engineering Conference held jointly with 9$^{th}$ ACM SIGSOFT International Symposium on Foundations of Software Engineering*, vol. 26(5) of *ACM SIGSOFT Software Engineering Notes*, ACM Press, pp. 109-120, 2001.

Grieskamp et al., "Instrumenting scenarios in a model-driven development environment," *Information and Software Technology*, 46(15), pp. 1027-1036, Dec. 2004.

Gurevich et al., "Semantic Essence of AsmL: Extended Abstract," *Formal Methods for Components and Objects, Second International Symposium, FMCO 2003*, vol. 3188 of LNCS, pp. 240-259, 2004.

Hallal et al., "Antipattern-based Detection of Deficiencies in Java Multithreaded Software," *Proceedings of the Fourth International Conference on Quality Software (QSIC2004)*, 10 pages, 2004.

Hallal et al., "An Automata-based Approach to Property Testing in Event Traces," *Proceedings of the IFIP TC6/WG6.1 XV International Conference on Testing of Communicating Systems (TestCom 2003)*, vol. 2644 of LNCS, pp. 180-196, 2003.

Huo et al., "On Testing Partially Specified IOTS through Lossless Queues," *Proceedings of the 16$^{th}$ IFIP International Conference, TestCOM 2004*, vol. 2978 of LNCS, pp. 76-94, 2004.

Lamport, "Time, Clocks, and the Ordering of Events in a Distributed System," Communications of the ACM, vol. 21, No. 7, pp. 558-565, Jul. 1978.

Petrenko et al., "Testing Transition Systems with Input and Output Testers," TestCom 2003, pp. 129-145.

Tasiran et al., "Runtime Refinement Checking of Concurrent Data Structures," *Electronic Notes in Theoretical Computer Science, Proceedings of the Fourth Workshop on Runtime Vertification*, 113:163-179, 2004.

Tretmans et al., "TorX: Automated Model-Based Testing," Editors: A. Hartman and K. Dussa-Ziegler, First European Conference on Model-Driven Software Engineering, Nuremberg, 2003, 13 pages.

Veanes et al., "On-The-Fly Testing of Reactive Systems," Technical Report MSR-TR-2005-05, Microsoft Research, 16 pages, Jan. 2005.

Bekkerman, "FSMGenerator Finite State Machine generating software," copyright 2002-2003, retrieved from "http://fsmgenerator.sourceforge.net/" on Feb. 28, 2008.

Fidge, "Partial Orders for Parallel Debutting," 1988, ACM, pp. 183-194.

Henninger et al., "Automatic Generation of Test Purposes for Testing Distributed Systems," Feb. 2004, SpringerLink, pp. 178-191.

* cited by examiner

GENERATING TEST CASES FOR SOFTWARE WITH COMPLEX PRECONDITIONS

TECHNICAL FIELD

The present application relates generally to the testing of software systems. For example, a software testing tool finds test cases for which a computer program is defined, where the test cases cover the possible execution paths of the program.

BACKGROUND

An important part of the development of software systems is testing. Because software systems can involve millions of lines of source code in separate modules or routines which interact, testing is necessary before a system can be shipped, so as to confirm that a given system performs as expected under various configurations and with various inputs. Oftentimes, extensive testing at different development levels, and under a wide variety of testing conditions, helps developers feel confident that the system is unlikely to exhibit unexpected behavior when used by consumers.

Different types of software system testing are used at different stages in development. For example, source code is tested at compile time for syntactic and logical errors before being compiled into executable code. Or, system implementations, either in part or in whole, are tested by users manually affecting inputs and configurations of the system to test against expected outputs. In yet other examples, this testing is automated, using a separate software module or application to automatically run software through batteries of tests.

A challenge in many types of software testing is the creation of representative and meaningful test cases, which are then used in manual or automatic testing of the software itself in order to test the behavior of the software under various operating conditions. Testing a piece of software with different test cases can involve such activities as, for example, varying inputs to a method or making differing function calls.

Unfortunately, development of test cases increases the costs of software testing in such scenarios. The test cases have to be derived somehow, and the test cases have to be run on the software being tested. Running these test cases can be very expensive, because the testing environment for the software might have costs and/or time constraints. For example, a test for mobile phone software could involve establishing a real phone connection.

Oftentimes, to reduce this cost, test cases are grouped into classes according to properties they share. In some scenarios, if every test case in a given class causes a piece of tested software to behave similarly, only one case out of the class of cases is used to verify that the software will behave properly for all inputs that fall into that class. Thus, one challenge is to identify classes from which a small number of test cases can be determined which cover the defined behavior of a program or piece of software.

There are certain disadvantages to testing a method or program on arbitrary input values. Some programs or methods are not defined for every possible input or are only used under specific conditions. A precondition indicates whether a method is defined (or used) for a particular input. If a tester only wants to test software on inputs for which the software is defined and/or used, it is desirable to reduce test cases down to those inputs which satisfy the precondition. Additionally, by carefully reducing the number of test cases, testing may be made more efficient, avoiding testing on cases which are undefined or never used in the software.

Sometimes, however, the process of deciding whether the behavior of a program/method is defined for a given test case is itself described by a complicated precondition program or method. If the precondition program/method is complex, it may substantially increase the difficulty of finding applicable test cases for the program/method being tested. Consider an example where a method m which takes two inputs, a and b, is defined only when the following precondition holds: a and b are relatively prime. Determining if two numbers are relatively prime is the same problem as determining that their greatest common divisor ["GCD"] is 1. Thus, the evaluation of this precondition involves the computation of the GCD. This means that determining test cases for the method m will involve determining which of the test cases have inputs a and b whose GCD is 1. If this GCD method is substantially more complex than m itself, then evaluating the precondition could dramatically increase the costs of finding test cases for m.

What is needed are efficient techniques for finding test cases for a program being tested which satisfy the precondition of the program.

SUMMARY

In summary, various tools and techniques described herein facilitate testing of methods with complex preconditions. For example, described tools and techniques produce feasible control paths for a method being tested, and for each of these paths, find a feasible control flow path for a precondition method. This helps develop a relatively small number of tests for the method being tested, and lessens the chance of inspecting inefficient control flow paths for the precondition method, which improves testing efficiency. The described tools and techniques include, but are not limited to, the following.

A tool generates test cases for a tested software method with an input precondition as follows. The tool finds one or more feasible control flow paths for the tested method. For each of the one or more feasible control flow paths found, the tool evaluates whether or not test inputs satisfy the precondition and outputs the results of the evaluating.

Or, a tool generates test conditions for a first program having a precondition on its inputs defined by a second program as follows. The tool constructs a third program, based at least in part on a first set of test conditions for the first program without the second program. The tool constructs the third program to be configured to test an input to determine if the input satisfies the first set of test conditions and if the input satisfies at least part of the second program. The tool determines a second set of test conditions for the third program.

Or, a tool determines a class of test cases for a tested computer program with an input precondition as follows. The tool generates one or more feasible control flow paths for a first control flow graph describing the tested program before determining which inputs satisfy the precondition. For a feasible control flow path generated for the tested program, the tool finds a feasible control flow path for a second control flow graph which tests both for the input precondition and for path conditions which define the feasible control flow path generated for the tested program. The tool determines a class of test cases which are defined by path conditions for the feasible control flow path found for the second control flow graph.

The various techniques and tools can be used in combination or independently.

Additional features and advantages of the invention will be made apparent from the following detailed description of embodiments that proceeds with reference to the accompanying drawings.

DETAILED DESCRIPTION

The following description is directed toward systems and techniques for facilitating software test case generation for a program, method, or other piece of software. For example, to generate test cases for a method which has a precondition, a test case generation system first finds test case conditions for the method and then uses these to find test cases which also satisfy the precondition. This facilitates efficient test case generation by limiting exploration of the precondition (or a method encapsulating the precondition) to test cases which have been found to be applicable to the method being tested.

In some implementations, a test case generation system generates a control flow graph for the method being tested (without reference to its precondition) and finds control flow paths for the control flow graph. The control flow paths are described by path conditions. The path conditions can then be combined with a method for the precondition and analyzed using a second control flow graph to find test cases for the tested method with its precondition. In other implementations, further efficiencies are realized by partitioning a control flow graph for a precondition method into straight and branched sections. The straight section is used along with the control flow graph for the method being tested to find the path conditions, which are then analyzed against the branched section of the precondition method in the second control flow graph.

The techniques and systems described herein will sometimes be described with reference to software or programs generally, and other times with reference to methods. A method is a particular kind of (sub)program or routine found in object-oriented programming languages. This usage is meant for the sake of simplicity of description, and should not be taken to imply any particular limitations on the techniques and systems described herein. It will be recognized that the techniques and systems described herein may apply to various levels of software abstraction, including programs, methods, functions, or other routines, and other parts of software systems.

In general, the test case generation system may be a single software module or multiple software modules, and the various tasks of the preconditioned method test case generation system may be performed concurrently or at separate times. Alternatively, one or more tasks of the test case generation system are performed by another system or systems.

1. Example Test Case Generation Using Control Flow Graphs

One way of representing a program involves the use of control-flow graphs. A control-flow graph is a directed graph whose nodes are the statements (or sets of statements) of the program, and whose arcs are annotated with conditions. A control-flow graph may also contain an initial node and final node(s) representing beginning and ending states within the program.

Figure 1:
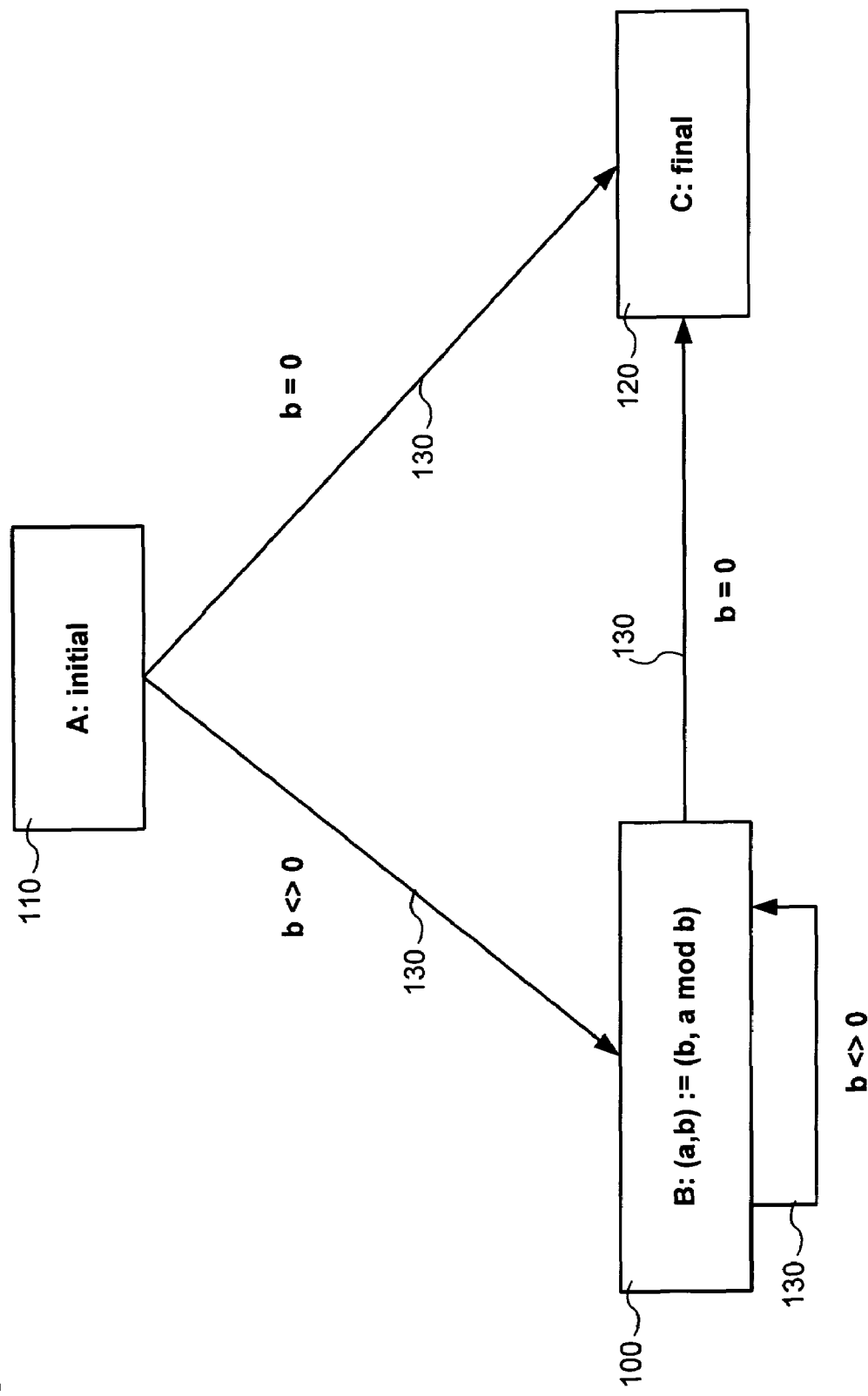
FIG. 1 illustrates a control flow graph representing a software method.

FIG. 1 illustrates an example control flow graph for the following program, which computes the GCD of two inputs, a and b:

```
while b< >0 do
    (a, b) := (b, a mod b);
return a;
```

FIG. 1 illustrates a control flow graph for this program which comprises three nodes, each of which represents either an initial node 110, a final node 120, or a node representing a statement, as node 100 does. Additionally, the control flow graph comprises transitions 130, which represent conditions on inputs and variables, which reflect transitions between the states represented by the nodes.

The nature of a control-flow graph lends itself to creating classes of inputs for a given program or method. For any given set of inputs, there is a unique control flow path through the control flow graph. For example, for the control flow graph illustrated in FIG. 1, the inputs a=3, b=6 will result in the path A, B, B, C. However, other inputs will result in the same path, such as a=1, b=2, or a=25, b=50. In this sense, the path A, B, B, C represents the entire class of inputs which result in that path being followed when the program is executed on those inputs.

Using a control flow path, a tester can generalize from a set of concrete inputs to an abstract class of inputs by considering the conditions on inputs which cause the path to be followed. The conjunction of the conditions along a path P in terms of the input values is the path condition of P and can be labeled as pathCondition(P). In the example path A, B, B, C given above, the path is followed by all inputs that satisfy the following conditions:

$$b<>0 \wedge a \bmod b<>0 \wedge b \bmod(a \bmod b)=0$$

This path condition abstracts away from the concrete input values and instead represents a system of constraint. Existing techniques, such as constraint solvers, theorem provers, or manual user interaction then allow for such a constraint system to be tested to see if it is solvable and, if so, to provide solutions to it. For example, the automatic theorem prover named Simplify, which is available from a research group at the Compaq Computer Corporation, may be used as a constraint solver. Alternatively, some other constraint solver or automatic theorem prover is used.

A path P is feasible if a solution for pathCondition(P) exists. Such a solution yields concrete input values which will cause the path P to be exercised. In the example of FIG. 1, the input a=3, b=6 is one such concrete input for the path A, B, B, C.

Test cases are often judged by how well they cover a program. As discussed above, different inputs that exercise the same path fall into a single class of inputs and are redundant regarding path coverage. By construction, the set of solutions of pathCondition(P) for all finite feasible paths P is a minimal set of inputs that achieve path coverage. When the number of feasible paths is finite, a complete set of test cases can be obtained; if the number of feasible paths is infinite, a suitable number of test paths, and thus test cases, can be chosen. Methods for identifying paths and solving for test cases are known, but opportunities for increasing efficiencies in test case generation are presented in the construction of the control flow graphs themselves.

2. Test Generation Overview

Figure 2:
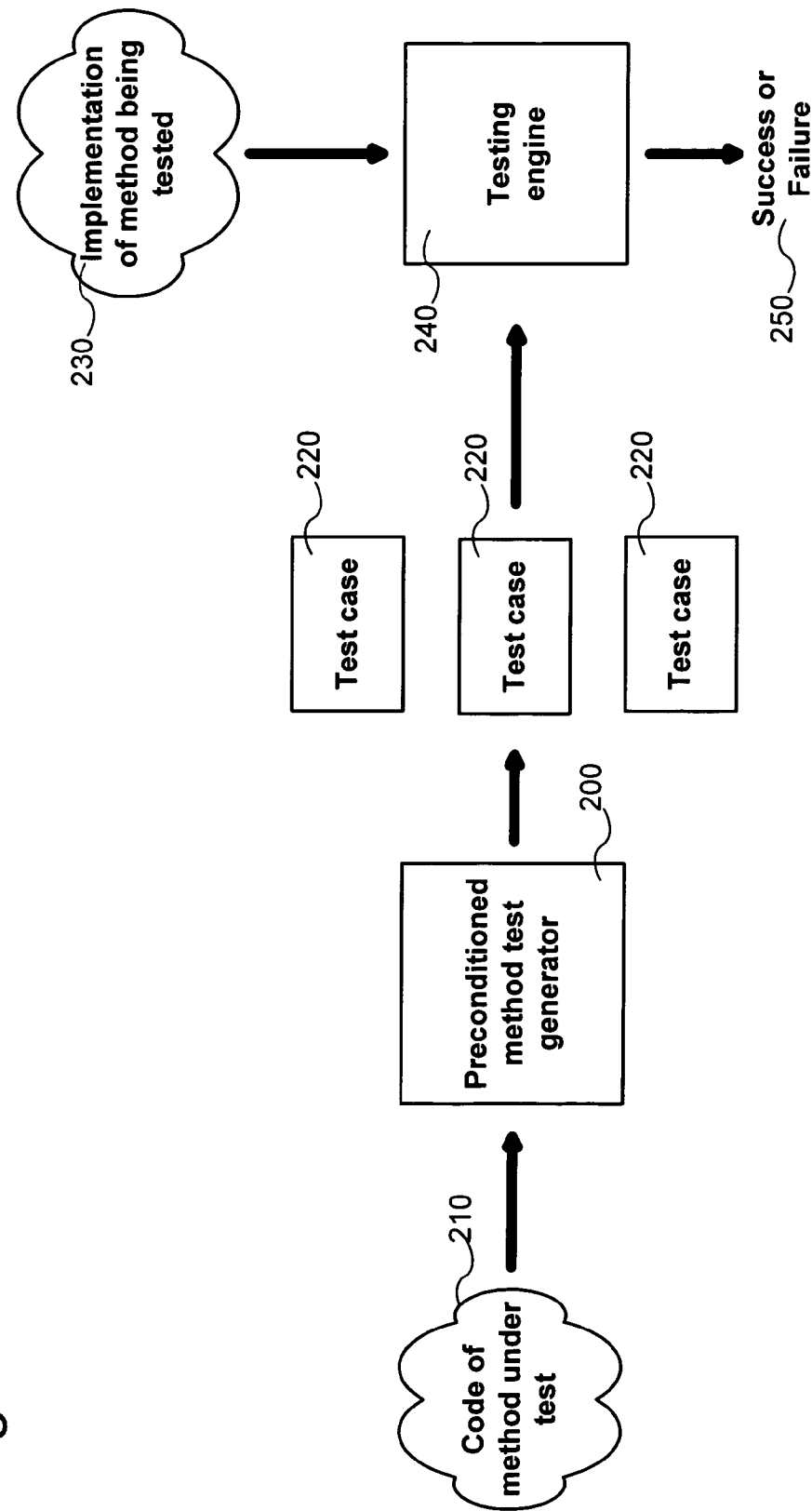
FIG. 2 is a block diagram of preconditioned method test generator used to perform software testing.

FIG. 2 illustrates a generalized diagram of a preconditioned method test generator 200 in a computer system. In various implementations, modules illustrated in FIG. 2 may be combined, subdivided, or omitted altogether. FIG. 2 illustrates the interactions between the code of a method being tested 210, the test generator 200, and a testing engine 240 to create test cases 220 from code of the method being tested 210. The test cases 220 are then tested against an actual implementation 230 of the method, so that the implementation 230 can be verified, for example, in an operating environment with realistic cost and/or time constraints.

In FIG. 2 the code of the method being tested 210 works in conjunction with (e.g., is input to) the preconditioned method test generator 200, which creates one or more test cases 220. The preconditioned method test generator 200 receives the code 210 and analyzes it to come up with the test cases 220. For example, this test method generation is performed through the creation and analysis of control flow graphs. The code 210 may be source code, machine code, or a higher-level software specification, such a model program or other behavior specification.

FIG. 2 also illustrates that, after generation, the test cases 220 are then passed to the testing engine 240, which tests them against the implementation 230 of the method being tested, and then produces an indication of success or failure 250. For examples, the testing engine 240 executes the implementation 230 of the method being tested using as input concrete values for the various test cases 220. In some systems, the preconditioned method test generator 200 is combined with the testing engine 240, and test cases 220 are generated and immediately tested against a specification. Alternatively, these are separate software modules or applications and/or testing occurs later.

3. Example of Naïve Technique of Generating Test Cases for a Method with a Precondition When testing a method M(I) which has a precondition Pre(I), with I representing generic input values, a naïve approach is to create a program which tests for the precondition and then performs the method if the precondition is satisfied. From this program a control flow graph can be made, followed by the discovery of feasible control flow paths and then test cases. An example of such a testing program would be:

```
if Pre(I) then
    M(I);
    return; // a final control flow node
else
    abort; // not a final control flow node
endif;
```

Figure 3:
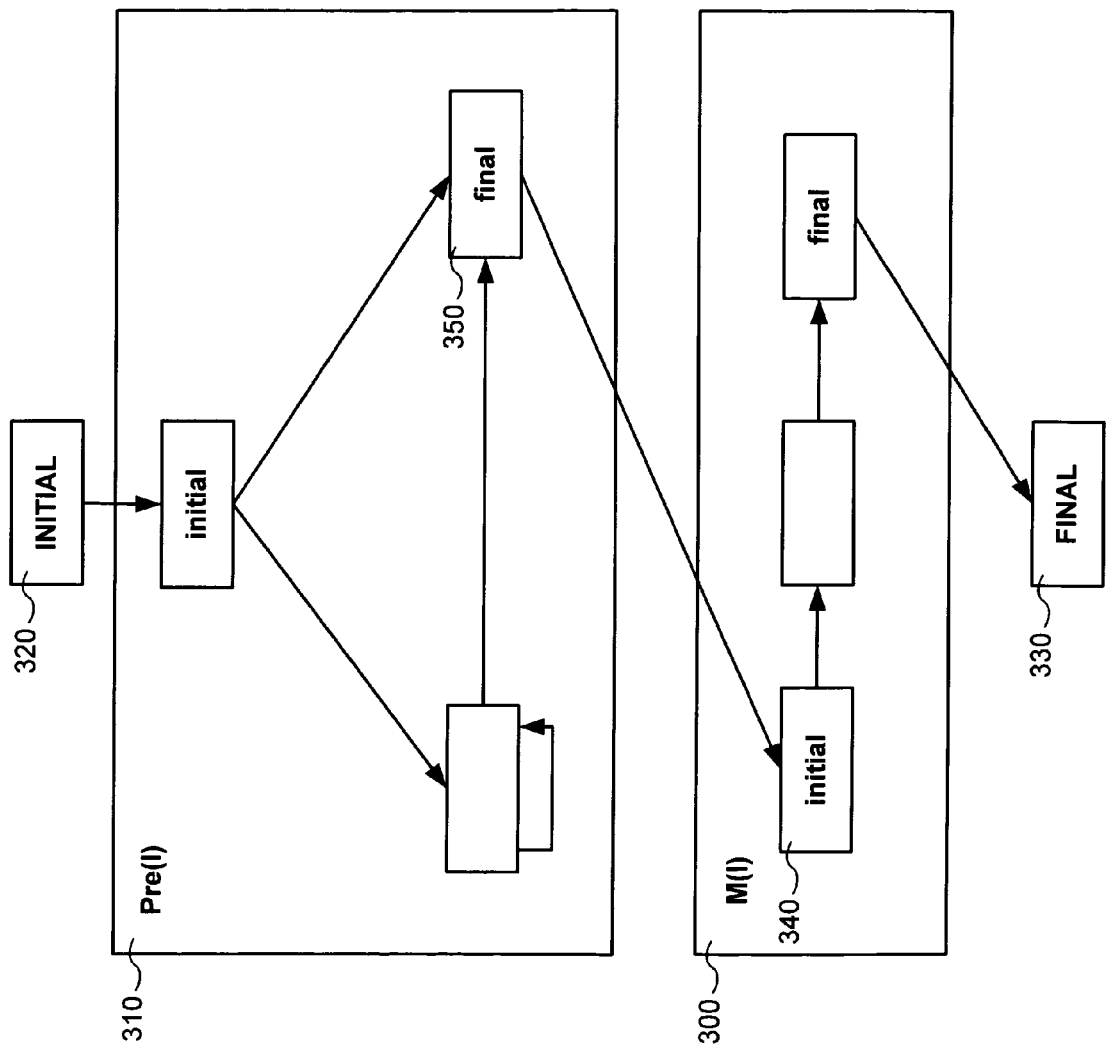
FIG. 3 is a block diagram of a control flow graph used in a naïve technique to generate test cases for a method with a precondition.

FIG. 3 illustrates an example control flow graph for this program. Because the program being illustrated combines the method being tested and the precondition method, the control flow graph sensibly combines a control flow graph 300 for the method and a control flow graph 310 for the precondition method. FIG. 3 also illustrates an initial node 320 and a final node 330 which represent the beginning and end of the program and serve to wrap the two smaller control flow graphs into the larger. The two smaller control flow graphs are connected by creating a transition (analogous to satisfaction of the "if" statement) between the final node 350 of the precondition control flow graph and the initial node 340 of the control flow graph of the method being tested. For the sake of simplicity, the non-final node to which a transition (analogous to the "else" statement) is made if the precondition fails is not illustrated.

As the control flow graph illustrates, any feasible path through the entire control flow graph for this testing program makes a path through both the precondition and through the control flow graph for the method being tested. Thus, for a path P for the graph of FIG. 3, pathCondition(P) will include test case constraints from the precondition and from the method being tested. By enumerating every feasible path P through the control flow graph of FIG. 3, classes of test cases are identified for M(I) which are also constrained by the requirements of Pre(I). The inclusion of these requirement constraints means that a complete set of classes of test cases can be found for M(I) which also satisfy the precondition. On the other hand, other classes of test cases with restricted values are screened out at the precondition phase. These restricted values represent values for which the method is undefined or unused.

FIG. 3 also illustrates a potential inefficiency inherent in this naïve approach. In the example illustrated, the control flow graph for M(I) is a simple straight line, while the control flow graph for Pre(I) contains a loop that depends on the number of times the GCD algorithm iterates. Because of this, while the graph for M(I) is likely to have only one (or relatively few) control flow path, the graph for Pre(I) may have many, depending on the number of times the loop is taken. And because the control flow graph for the testing program of FIG. 3 is a combination of these graphs, the control flow graph of FIG. 3 will most likely give rise to more than one path. Rather than generating only one class of test cases, which the simple control flow graph of M(I) suggests is all that is necessary, the approach taken in FIG. 3 may actually increase the number of paths found, reflecting the behavior of the precondition method. Increasing the number of test case classes (compared to if the precondition had not been included) is not desirable. What follows below are novel ways of reducing the effect that a complex precondition can have on generating test cases, and thus reducing the number of test cases generated.

More generally, the control flow branches of precondition Pre(I) partition the classes of test cases finer than necessary for method M(I). Without a special treatment of Pre(I), a testing tool may generate more test cases than are necessary by taking into account the finely partitioned test case classes.

Pre(I) is a function over all input parameters, and thus potentially contains different branches for every possible input value. These branches can lead to a separate test case for every possible input value. The inputs adequate to cover the paths of method M(I) may (and often are) fewer than the entire range of inputs.

4. Examples of Processes of Test Case Generation

The systems and techniques described in this section use the precondition to constrain known paths for the method under test, not requiring that every allowable path through the precondition be found or subsequently tested. For a tested method with a precondition, a software testing tool first derives feasible control flow paths for the tested method without checking the precondition. Then, for each path P derived, a testing program is created which checks the precondition, subject to the path condition of the path P. For example, such a testing program is implemented as the following:

```
if (pathCondition(P) and then Pre(I)) then
    return; // a final control flow node
else
    abort; // not a final control flow node
endif;
```

Figure 4:
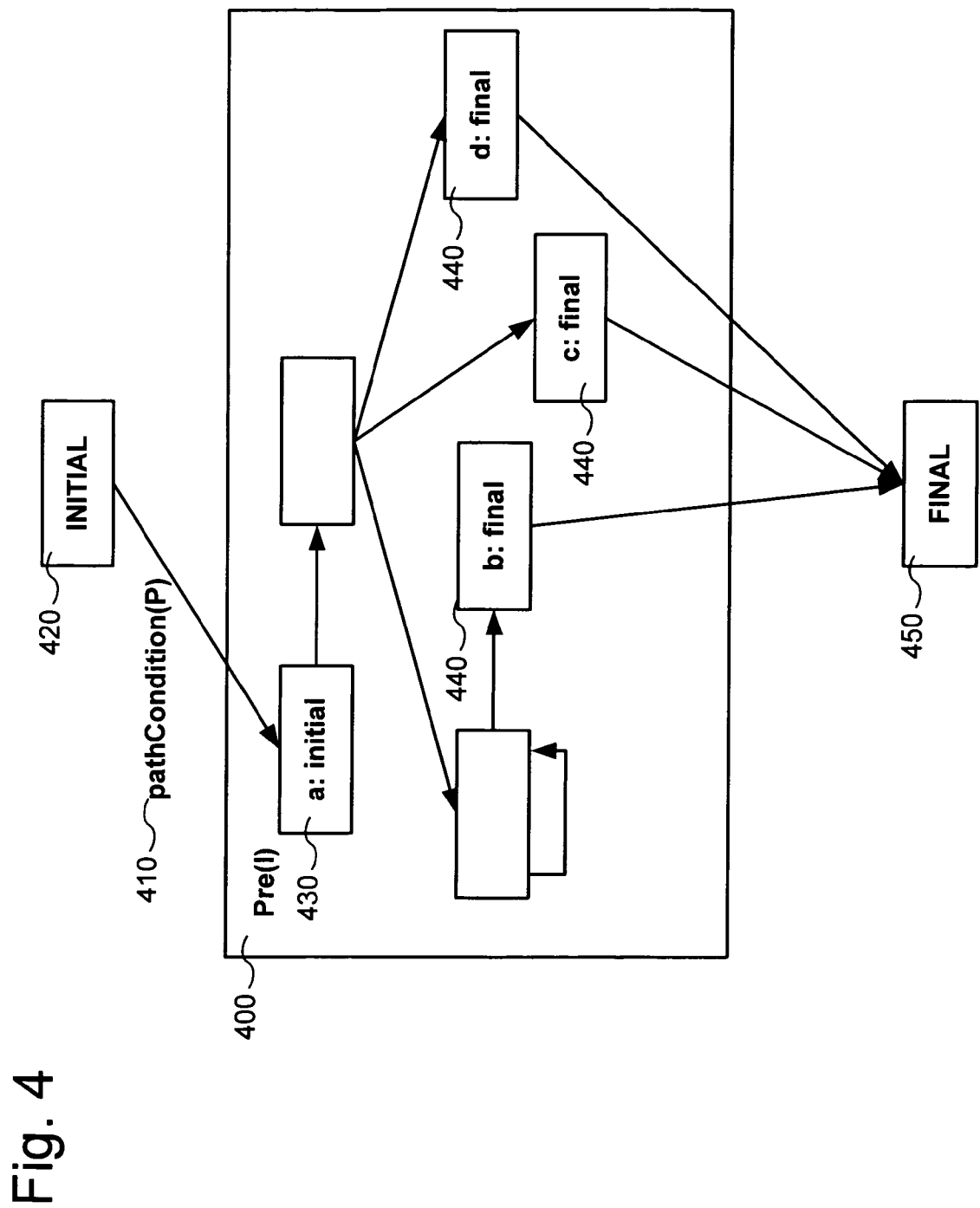
FIG. 4 is a block diagram of an example of a control flow graph used by the preconditioned method test generator of FIG. 2 for generating test cases for a method with a precondition.

FIG. 4 illustrates one example of a control flow graph for this type of testing program for a given path P and a precondition method Pre(I). When the precondition is fulfilled, a path Q reaches the final node 450 through the entire graph. A separate control flow graph for the method being tested, from which the path P was derived, is not illustrated. Instead, in the control flow graph of FIG. 4, the only transition from the initial node 420 is through a transition 410 defined by pathCondition(P). Thus, a path Q through the entire testing program of FIG. 4 will satisfy the path condition of the transition 410, and thus will coincide with a path P through the control flow graph for the method being tested. The transition 410 leads to the initial node 430 for Pre(I). Pre(I) is not modified and thus one or more paths Q, if any, can be found which lead through it to its final nodes 440. These final nodes 440 each have a transition, created from the "if" statement, to the final node 450 for the testing program.

As FIG. 4 illustrates, if a path Q can be found through the control flow graph of FIG. 4 it will give rise to solutions which satisfy both Pre(I) and pathCondition(P). Thus, a set of test cases for a method being tested is created, where the set is also constrained by the precondition. If, however, no such path Q exists, then path P is abandoned, because the path P is based on inputs which do not satisfy the precondition, and thus should not be used for a test case. By creating control flow graphs such as the one in FIG. 4 for every path P found for the original method being tested, a minimal set of test cases classes can be found which both satisfy the precondition and adequately cover the paths of the original method being tested.

In other words, this technique reduces the adverse effects that a complex precondition may have on test case generation. For a given path P through a tested method, only one path through the entire control flow graph of FIG. 4 needs to be found. Finding every possible path of execution through Pre(I) for the path P is not required. If, for a given class of test cases defined by the path P, a single path through the control flow graph for Pre(I) can be found, there is at least one input that satisfies pathCondition(P) and Pre(I), which means there is a valid test case for the method being tested.

FIG. 4 illustrates the advantage that this technique provides. In the example shown in FIG. 4, Pre(I) branches into numerous paths of execution, one of which involves a loop. The existence of this loop alone could mean that Pre(I) is covered by a great many paths. But because only one path through Pre(I) needs to be found for a given path P, a simple path to the final nodes c or d is as acceptable as a possibly circuitous path to final node b. Potentially, many inefficient and costly paths through Pre(I) can be ignored, which speeds up the processes of test case generation and subsequent testing.

5. Examples of Control Flow Graph Path Finding Techniques

Different techniques exist for finding feasible paths from an initial node to a final node. Two well understood algorithms are frequently used to find paths in a graph: depth-first search and breadth-first search. Depth-first search is an algorithm that eagerly follows a single path node by node in the control-flow graph and backtracks when the path cannot be continued. One problem with depth-first searching is that it can get stuck in a loop of the control-flow graph.

This is especially problematic when searching for paths for a control flow graph for a method being tested because no check ensures that the method's precondition holds to begin with. For example, if a method involves iteratively reducing an integer input by 1 until it reaches zero, that method (and its corresponding control flow graph) could end up in an infinite loop if given a negative input. To avoid this problem, a variant of depth-first search called "iterative deepening depth-first search" can be used. It first only considers paths of length one, then two, and so on, up to predetermined length, which allows a relatively short path through a control flow graph to be found while also avoiding the dangers of infinite loops.

Breadth-first searching also avoids this danger. A high-level difference between breadth-first and iterative deepening depth-first searching is that, in breadth-first searching, paths of certain depths are not considered one after the other, but in parallel.

In another technique, paths which are infeasible, (e.g. those whose associated path condition is not feasible) are pruned during the search by using a constraint solver.

6. Examples of Processes of Test Case Generation

Figure 5:
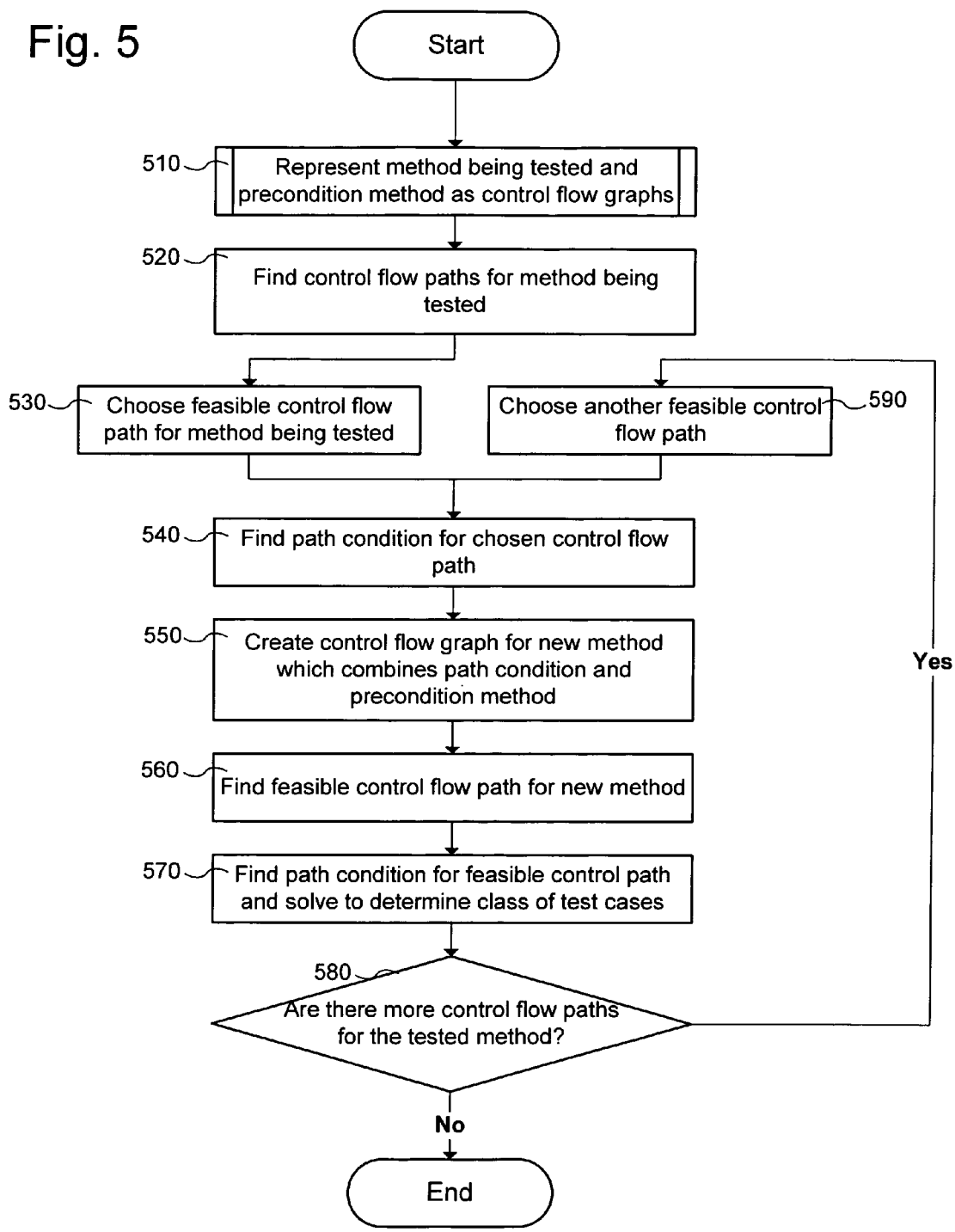
FIG. 5 is a flowchart illustrating a process performed by the preconditioned method test generator of FIG. 2 for generating test cases.

FIG. 5 is a flowchart illustrating one example of a process performed by a software testing tool such as the preconditioned method test generator 200 for generating test cases for a method with a precondition. In various implementations, blocks illustrated in FIG. 5 may be combined, broken into sub-blocks, or omitted, and the ordering of blocks may be modified.

The process starts at block 510, where the software testing tool represents the method being tested and the method defining its precondition as control flow graphs. For example, this representation may be done through an analysis of source or machine code for the methods; or, it is done by reviewing a specification of the methods. As described in the next section, an alternative method of representing these methods may be performed which introduces additional efficiencies.

The process then continues to block 520, where the software testing tool finds feasible control flow paths for the method being tested. Examples of techniques for finding these feasible control flow paths are discussed above in section 5. In a preferred implementation, every feasible control flow path is found so that the test cases generated by the process of FIG. 5 are as complete as possible; however, the number of paths might be very big or even infinite. In these cases, only some paths representing critical behavior or likely faults may be selected in other implementations.

Next, at block 530, the tool chooses a feasible control flow path for the method being tested. The choosing mechanism at block 530 may vary between implementations. In the preferred implementation, the process of FIG. 5 will eventually chose every path found at block 520.

The process then continues to block 540, where the tool finds the path condition for the chosen feasible control flow path. As discussed above, the path condition can be found as the conjunction of the individual transition conditions along the chosen feasible path.

Next, at block 550, the tool creates a control flow graph for a testing program or method which combines the path condition and the precondition method. One example of such a testing program is found above in section 4, with its corresponding control flow graph illustrated in FIG. 4. In some implementations, code for the testing method is created from the code for the precondition method and the method being tested. Alternatively, the control flow graphs created at block 510 are directly manipulated to create the control flow graph of block 550.

The process then continues to block 560, where the tool finds a feasible control flow path (if one exists) for the newly-created testing method. While more than one control path for the testing method may be found, it will be recognized that only one path is necessary for test case generation.

Next, at block 570, the tool finds the path condition of the chosen feasible control flow path of block 560. The path condition may then or later be solved to determine representative input values for the path condition's class of test cases for the method being tested.

The process then continues to block 580, where the tool determines if there are additional feasible control flow paths for the method being tested. If so, the tool chooses another feasible control flow path at block 590, and the process repeats for this new path. If not, the process ends. If every feasible control flow path for the method being tested has been investigated, then a minimal but complete set of test cases for the method being tested have been found.

7. Examples of Partitioning Precondition Methods

The techniques of the preceding section avoid inefficient path-finding through sections of precondition methods that are overly-branched or contain loops, which makes test case generation more efficient. The control flow graph for the precondition is searched after the control flow graph for the method being tested is searched, which means that only one path needs to be found through the precondition control flow graph. However, if a section of the precondition control graph could be efficiently searched along with the method being tested, then later testing of paths that do not satisfy that precondition section could be avoided, providing still greater efficiency.

Figure 6:
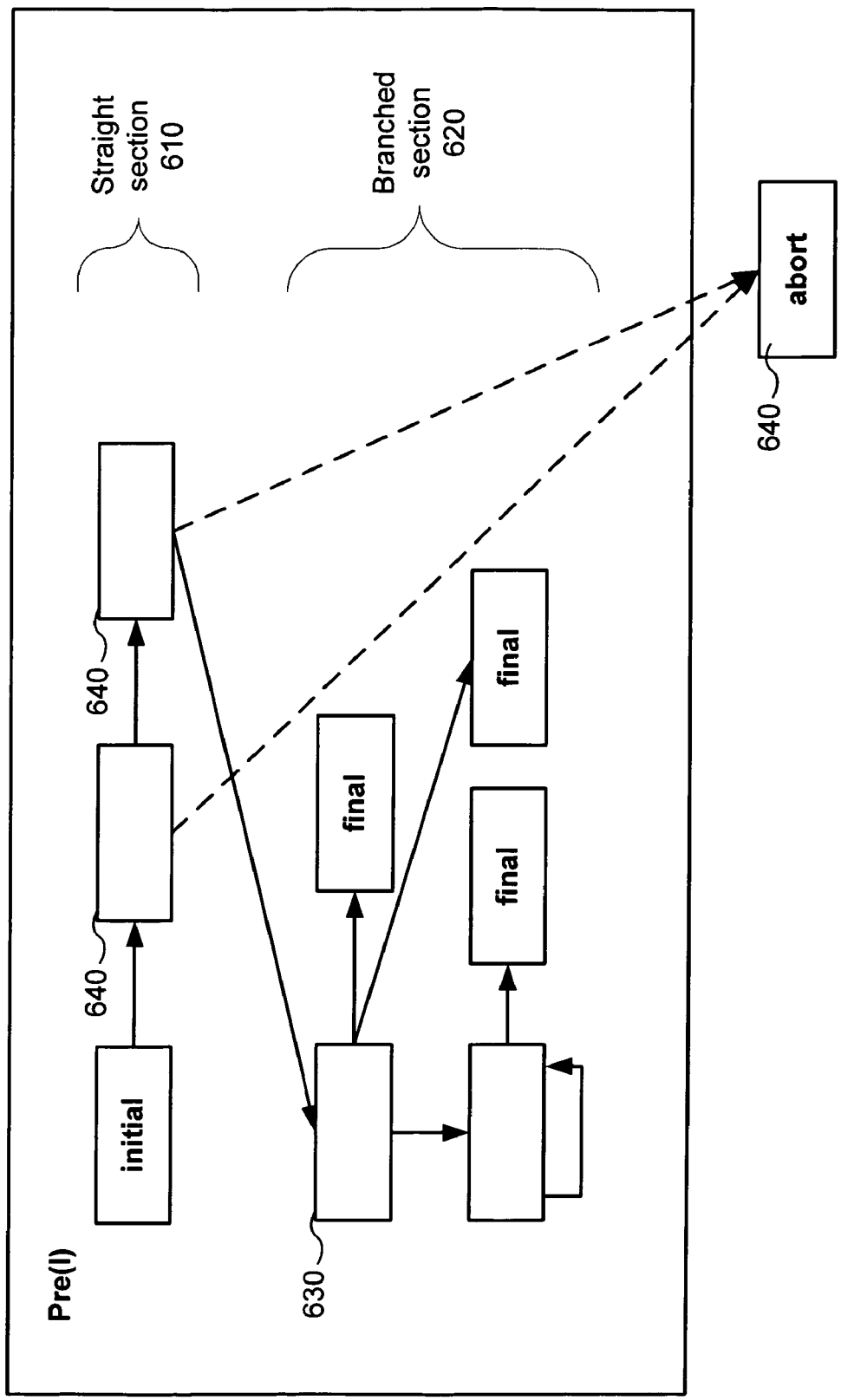
FIG. 6 is a block diagram of a control flow graph for a precondition method which has been partitioned into straight and branched sections.

FIG. 6 illustrates one partitioning of a precondition method so that a section of it can be searched along with a method being tested when feasible control flow paths are generated. In FIG. 6, a precondition method Pre(I) is illustrated, divided into a "branched" section 620 and a "straight" (or unbranched) section 610. By separating out the branched section, this technique more efficiently isolates the part of the precondition which could give rise to inefficient looping or branching. The straight section is then left to be included when searching for feasible paths through the graph for the tested method (e.g., the process of block 520 of FIG. 5).

For example, the partitioning between the straight and branched sections is done by finding the first node that contains more than one transition to a non-abort node. Thus, in the illustrated control flow graph, the node 630, which has transitions to three different nodes, divides the graph between the straight section 610 and the branched section 620. In FIG. 6, the nodes 640, each of which contains a transition out of the precondition method (to a node representing an abort status), are still considered part of the straight section of the control flow graph. This is because non-successful transitions going out of the precondition method will not be searched when trying to find feasible control flow paths, and thus are of no concern when looking for a branched section. Alternatively, the partitioning is done at another node, although in the preferred implementation it is not done after the first branching node, in order to avoid incorporating inefficiencies early in the test case generation process. In some cases, a control flow graph may contain only a straight section or only a branched section, and may therefore not be partitioned. In these cases, the entire precondition can either be searched before the tested method, or is searched after paths of the tested method have been found.

In another implementation, the control-flow-graph nodes are reordered to obtain a longer straight section and a shorter branched section, when possible. In yet another implementation, branching parts of the graph are replaced by non-branching transitions, when possible.

Figure 7:
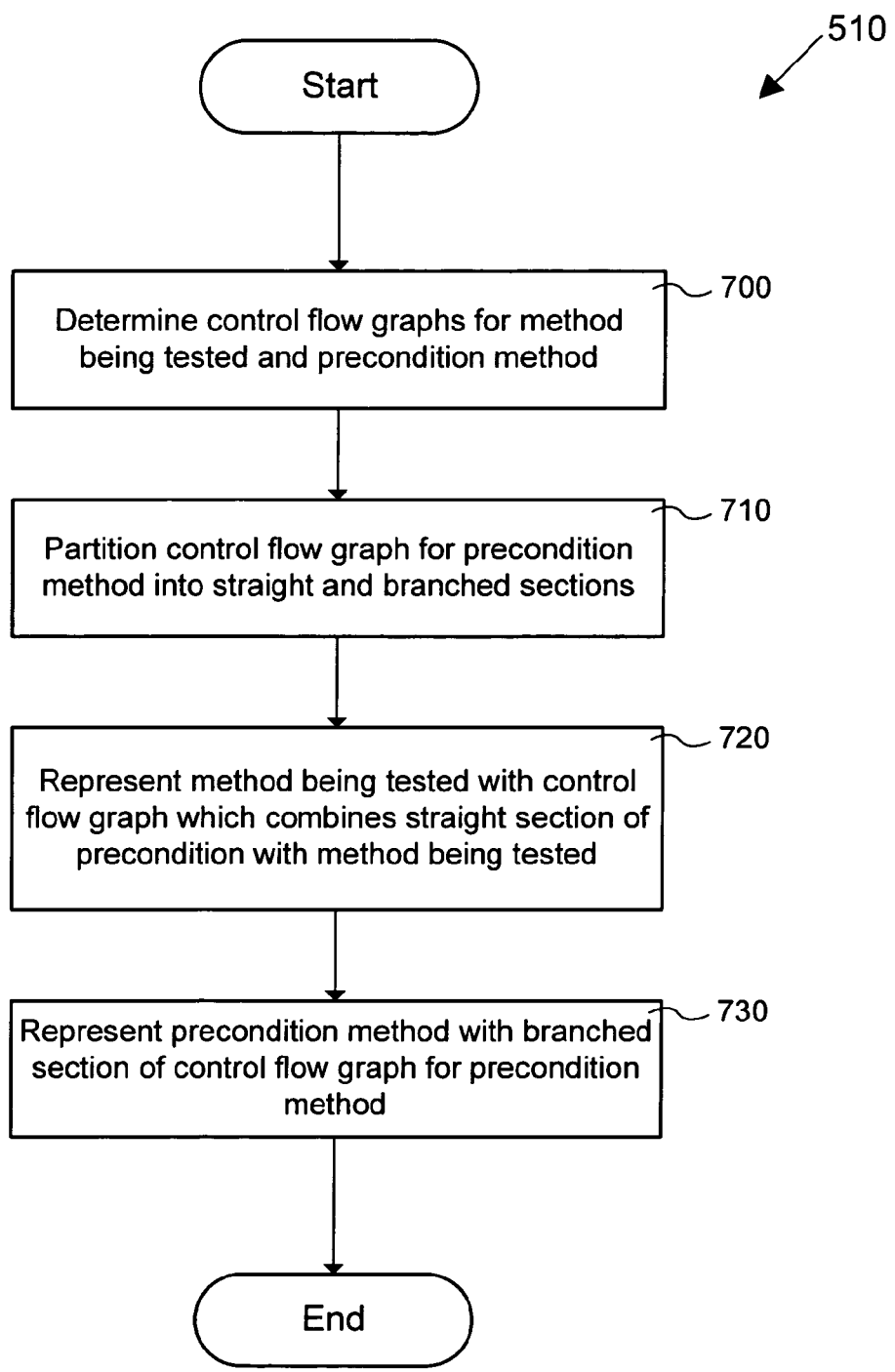
FIG. 7 is a flowchart illustrating an alternate process performed by the preconditioned method test generator of FIG. 2 for generating test cases.

FIG. 7 is a flowchart illustrating one example of an alternate process performed by a software testing tool such as the preconditioned method test generator 200. In FIG. 7, the tool performs the process of block 510 of FIG. 5 while utilizing partitioning as illustrated in FIG. 6. In various implementations, blocks illustrated in FIG. 7 may be combined, broken into sub-blocks, or omitted, and the ordering of blocks may be modified. In some implementations, some or all of the steps of FIG. 7 may be performed at different points in the process of FIG. 5 other than block 510.

The process begins at block 700, where the tool determines the control flow graphs for the method being tested and the precondition method. Various implementations may perform this process in different ways, as discussed above.

Next, at block 710, the tool partitions the control flow graph for the precondition, using one of the mechanisms described above.

Next, at block 720, the tool represents the method being tested with a control flow graph that combines the straight section of the precondition control flow graph with the graph for the tested method itself. For example, this is achieved by creating a control flow graph which, for a tested method M(I) and a straight section represented by PreStraight(I), corresponds to the program:

```
if PreStraight(I) then
    M(I);
    return;
else
    abort;
end;
```

Figure 8:
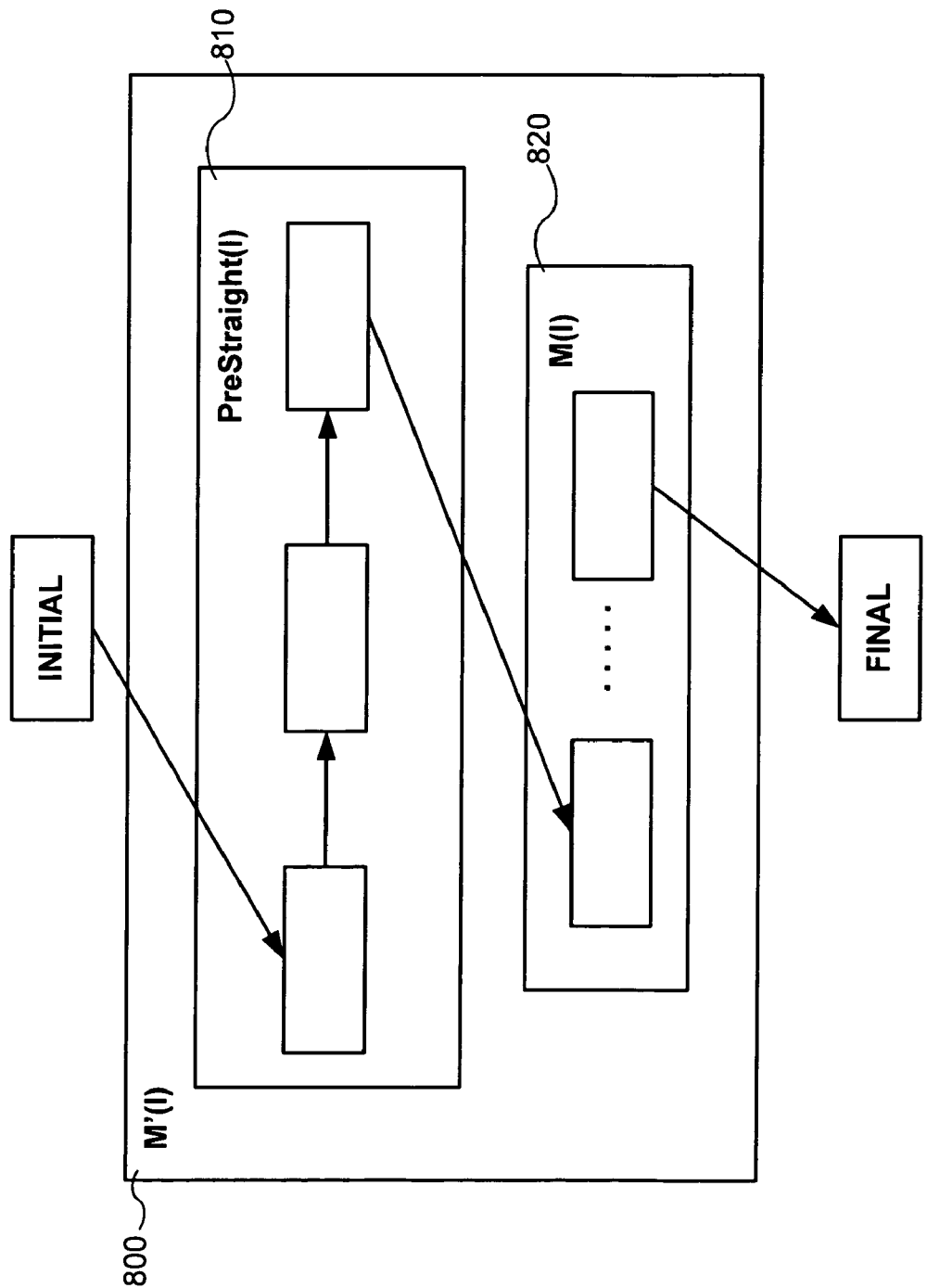
FIG. 8 is a block diagram of a control flow graph which combines the straight section of a precondition method with a control flow graph of a method being tested by the preconditioned method test generator of FIG. 2.

FIG. 8 illustrates a control flow graph that corresponds to the program. In the control flow graph, a new method M'(I) 800 is created which combines the straight part of the precondition 810 with the graph 820 for M(I). M'(I) is later searched for feasible control flow paths in the process of block 520 of FIG. 5. As FIG. 8 illustrates, because there is only one path through the straight part of the precondition, no additional feasible paths are possible through the graph of M'(I) than were possible through the graph of M(I). Yet, because part of the precondition is present when searching for feasible control flow paths of M(I), some inputs which do not satisfy this part of the precondition can be weeded out earlier in the test generation process.

Continuing in the process of FIG. 7, at block 730 the tool uses only the branched section of the precondition as the precondition for the purposes of the process of FIG. 5 (e.g., blocks 550 and 560), after which point the process of FIG. 7 ends. Thus, rather than search through the entire precondition control flow graph for a feasible path Q for each path P of M'(I), only the branched part (here referred to as PreBranched (I)) is searched. For example, the new control flow graph created in the process of block 550 represents the program:

```
if pathCondition(P) and PreBranches(I) then
    return;
else
    abort;
endif;
```

Then, for each path P, the tool attempts to find a feasible path Q leading to a goal node. The end results of the technique shown in FIGS. 7-9 are the same as for the technique described above in section 4, but the processing is more efficient since infeasible paths have been screened out with PreStraight(I), and the precondition is now represented only by the branched section of the precondition.

Figure 9:
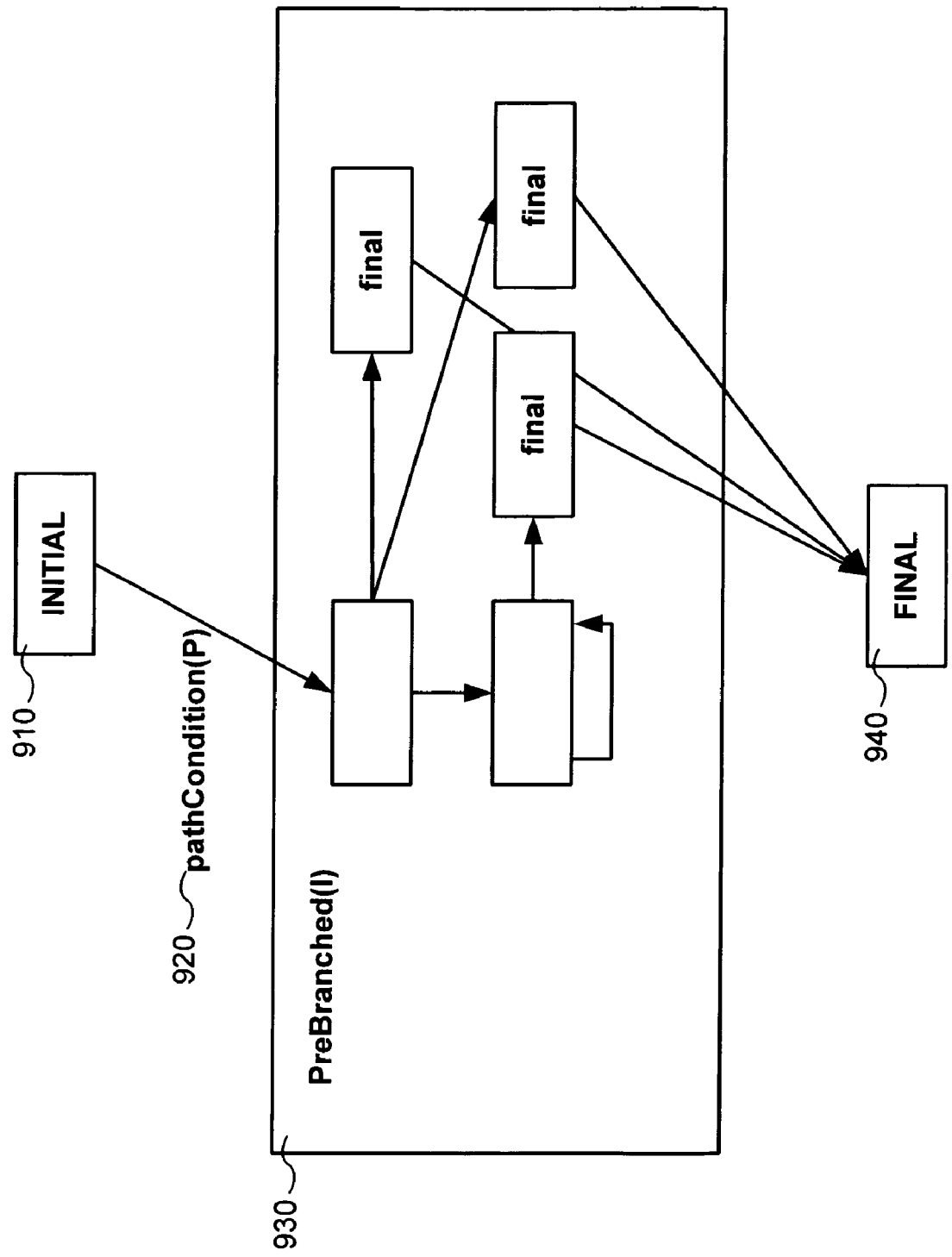
FIG. 9 is a block diagram of a control flow graph which uses the branched section of a precondition method to generate test cases for a method being tested.

FIG. 9 illustrates a control flow graph corresponding to this program and a given path P. The control flow graph starts at initial node 910, and then transitions into the PreBranched(I) control flow graph 930 if pathCondition(P) is met. Then, for each of the (possibly multiple) final nodes that exist in the control graph 930 of PreBranched(I), there is a transition to the final node 940 of this new program. As in the process of FIG. 5 above, if a single feasible control flow path exists for this graph, then a class of test cases for the original method M(I) can be solved for. By isolating the branched part of the precondition, FIGS. 7-9 show a more efficient method of finding these test cases, as only the problematic branching nodes are searched at this late point.

8. Computing Environment

The above described techniques and systems (including the preconditioned method test generator 200) can be implemented on any of a variety of computing devices and environments, including computers of various form factors (personal, workstation, server, handheld, laptop, tablet, or other mobile), distributed computing networks, and Web services, as a few general examples. The systems can be implemented in hardware circuitry, as well as in software 1080 executing within a computer or other computing environment, such as shown in FIG. 10.

Figure 10:
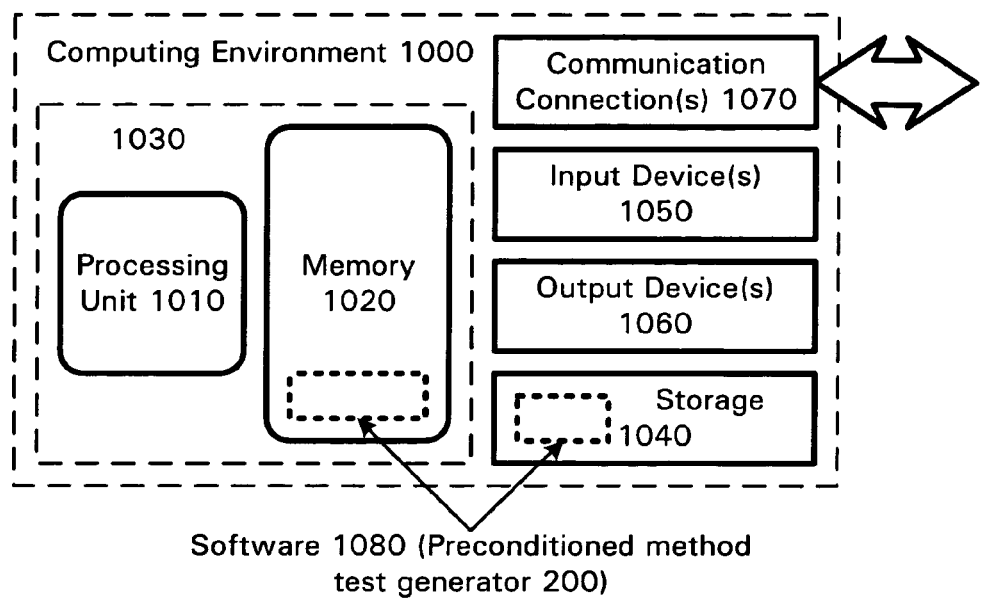
FIG. 10 a block diagram of a suitable computing environment for implementing the systems of FIG. 2.

FIG. 10 illustrates a generalized example of a suitable computing environment 1000 in which the described techniques can be implemented. The computing environment 1000 is not intended to suggest any limitation as to scope of use or functionality of the invention, as the present invention may be implemented in diverse general-purpose or special-purpose computing environments.

With reference to FIG. 10, the computing environment 1000 includes at least one processing unit 1010 and memory 1020. In FIG. 10, this most basic configuration 1030 is included within a dashed line. The processing unit 1010 executes computer-executable instructions and may be a real or a virtual processor. In a multi-processing system, multiple processing units execute computer-executable instructions to increase processing power. The memory 1020 may be volatile memory (e.g., registers, cache, RAM), non-volatile memory (e.g., ROM, EEPROM, flash memory, etc.), or some combination of the two. The memory 1020 stores software 1080 implementing, for example, the preconditioned method test generator 200.

A computing environment may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The storage 1040 may be removable or non-removable, and includes magnetic disks, magnetic tapes or cassettes, CD-ROMs, CD-RWs, DVDs, or any other medium which can be used to store information and which can be accessed within the computing environment 1000. The storage 1040 stores instructions for the software 1080.

The input device(s) 1050 (e.g., for devices operating as a control point in the preconditioned method test generator 200) may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The preconditioned method test generation techniques and tools presented herein can be described in the general context of computer-readable media. Computer-readable media are any available media that can be accessed within a computing environment. By way of example, and not limitation, with the computing environment 1000, computer-readable media include memory 1020, storage 1040, communication media, and combinations of any of the above.

The techniques and tools presented herein can be described in the general context of computer-executable instructions, such as those included in program modules, being executed in a computing environment on a target real or virtual processor. Generally, program modules include routines, programs, methods, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

In view of the many possible embodiments to which the principles of our invention may be applied, we claim as our invention all such embodiments as may come within the scope and spirit of the following claims and equivalents thereto.

We claim:

1. A computer implemented method of generating test cases for a tested software method with an input precondition, the method comprising:
    partitioning a precondition method for the precondition into a branched section and a straight section, wherein the straight section of the precondition method can contain branches that lead directly to a rejection of an input;
    finding one or more feasible control flow paths for the tested method, wherein the finding comprises checking that the one or more feasible control flow paths satisfy the straight section of the precondition method;
    for each of the one or more feasible control flow paths found, evaluating whether or not test inputs satisfy the precondition, wherein the evaluating comprises creating a second method which returns successfully if both the branched section of the precondition method and path conditions for a particular one of the one or more feasible control flow paths for the tested method are satisfied for particular test inputs; and
    outputting results of the evaluating.

2. The method of claim 1, wherein the evaluating test inputs comprises finding a feasible control flow path for the second method.

3. The method of claim 1, wherein the second method returns successfully if both the precondition and the path conditions for the particular one of the one or more feasible control flow paths for the tested method are satisfied for the particular test inputs.

4. The method of claim 3, wherein the second method aborts if either the precondition or the path conditions for the particular feasible control flow path for the tested method are not satisfied for the particular test inputs.

5. The method of claim 1, wherein the finding the one or more feasible control flow paths for the tested method further comprises searching through a control-flow graph of the tested method.

6. The method of claim 5, wherein the searching comprises using an iterative deepening depth-first search.

7. The method of claim 5, wherein the searching comprises using a breadth-first search.

8. The method of claim 1, further comprising generating one or more computer-readable media which contain instructions describing the tested software method.

9. A computer-implemented method for generating test conditions for a first program, the first program having a precondition on its inputs defined by a second program, and the method comprising:
    providing the second program, wherein the second program includes a precondition method for the precondition, the precondition method being partitioned into a branched section and a straight section, and wherein the straight section of the precondition method can contain branches that lead directly to a rejection of an input;
    finding a feasible control flow path for a first set of test conditions for the first program, wherein the finding comprises checking that the feasible control flow path satisfies the straight section of the precondition method;
    constructing a third program, based at least in part on the first set of test conditions for the first program without the second program, the third program configured to test an input to determine if the input satisfies the first set of test conditions and if the input satisfies at least part of the second program, wherein the third program includes third program method which returns successfully if both the branched section of the precondition method and path conditions for the feasible control flow path for the first set of conditions for the first program are satisfied for particular test inputs; and
    determining a second set of test conditions for the third program.

10. The method of claim 9, wherein the determining the second set of test conditions includes finding a feasible control flow path for a control flow graph for the third program and finding test conditions associated with the found path.

11. The method of claim 9, wherein the straight section of the precondition method of the second program only branches when an input is rejected, and the branched section of the precondition method contains other branches, and wherein the first set of test conditions for the first program is determined by finding the feasible control flow graph for a fourth program comprising the straight section of the precondition method of the second program combined with the first program.

12. One or more computer-readable storage media containing instructions which, when executed by a computer, cause the computer to perform a method for determining a class of test cases for a tested computer program, the tested program having an input precondition, and the method comprising:
    partitioning a precondition method for the precondition into a branched section and a straight section, wherein the straight section of the precondition method can contain branches that lead directly to a rejection of an input;
    generating one or more feasible control flow paths for a first control flow graph describing the tested program before determining which inputs satisfy the precondition, wherein the generating comprises checking that the one or more feasible control flow paths satisfy the straight section of the precondition method;
    for a feasible control flow path generated for the tested program, finding a feasible control flow path for a second control flow graph which tests both for the input precondition and for path conditions which define the feasible control flow path generated for the tested program, wherein a second method for the second control flow graph returns successfully if both the branched section of the precondition method and the path conditions which define the feasible control flow path generated for the tested program are satisfied for particular test inputs; and
    determining a class of test cases which are defined by path conditions for the feasible control flow path found for the second control flow graph.

13. The computer-readable media of claim 12, wherein:
    the second control flow graph successfully reaches a final node for an input which satisfies both the input precondition and the path conditions for the feasible control flow path generated for the tested program; and
    the second control flow graph does not reach a final node for an input which either does not satisfy the input precondition or does not satisfy the path conditions for the feasible control flow path generated for the tested program.

14. The computer-readable media of claim 12, wherein the first control flow graph further describes control flow paths for the straight section.

* * * * *